(No Model.)

G. WONDERS.
LEMON JUICE EXTRACTOR.

No. 584,805. Patented June 22, 1897.

WITNESSES:
J. W. Danielson Jr.
C. Gerst

INVENTOR
George Wonders
BY
Edgar Tate & Co
ATTORNEYS

UNITED STATES PATENT OFFICE.

GEORGE WONDERS, OF JOHNSTOWN, PENNSYLVANIA.

LEMON-JUICE EXTRACTOR.

SPECIFICATION forming part of Letters Patent No. 584,805, dated June 22, 1897.

Application filed March 2, 1897. Serial No. 625,721. (No model.)

*To all whom it may concern:*

Be it known that I, GEORGE WONDERS, a citizen of the United States, residing at Johnstown, in the county of Cambria and State of Pennsylvania, have invented certain new and useful Improvements in Lemon-Juice Extractors, of which the following is a full and complete specification, such as will enable those skilled in the art to which it appertains to make and use the same.

This invention relates to devices for extracting the juice of lemons and other fruits; and the object thereof is to provide an improved device of this class which is simple in construction and by means of which the juice of a lemon, orange, or other fruit may be quickly, easily, and thoroughly extracted.

The invention is fully disclosed in the following specification, of which the accompanying drawings form a part, in which the separate parts of my improvement are designated by the same numerals of reference in each of the views, and in which—

Figure 1:
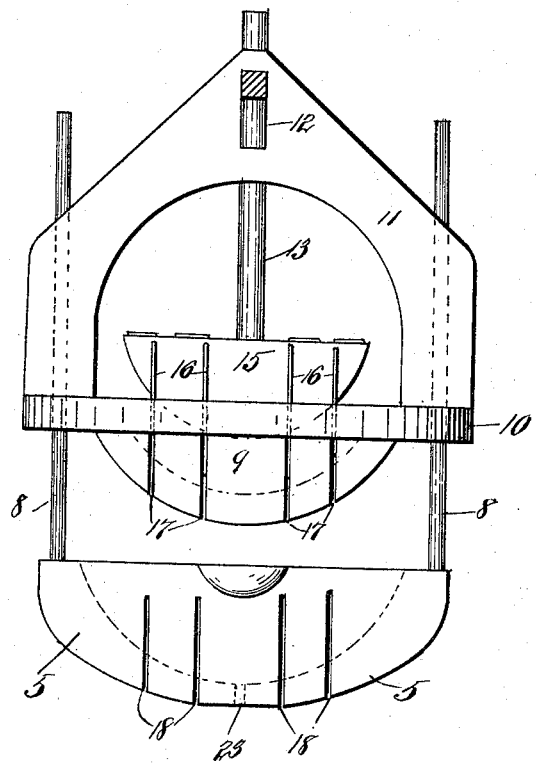
Figure 2:
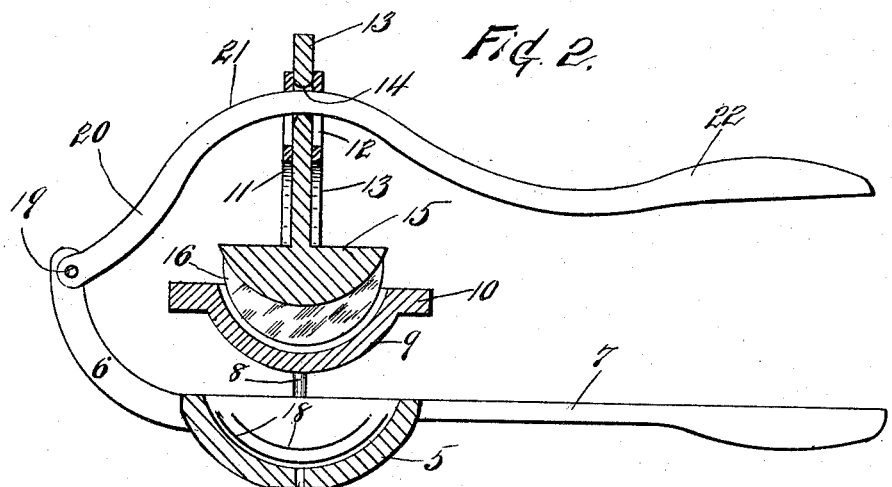

Figure 1 is a front view, part of the construction being shown in section; and Fig. 2, a sectional side view thereof.

In the practice of my invention I provide a device of the class herein specified, which consists of a cup-shaped receptacle 5, to one side of which is secured an arm 6, and the opposite side of which is provided with a handle 7, and secured to the sides of the cup-shaped receptacle 5, at right angles to the arm 6 and the handle 7, are vertical rods 8, on which is mounted a vertically-movable cup-shaped plunger 9, provided with an annular flange or rim 10, through which the rods 8 pass, and secured to or formed on the flange or rim 10 of the cup-shaped plunger 9 is a vertical yoke 11, through which said rods 8 also pass, and the upper portion of the yoke 11 is provided with a vertical slot 12, and passing vertically through the central upper portion of the yoke 11, through the slot or opening 12 and longitudinally thereof, is a shaft 13, which is provided with a transverse opening 14, and the lower end of the shaft 13, the lower surface of which is convex to correspond with the cup-shaped plunger 9 and said lower surface of the plunger 15, is provided with a plurality of circular blades 16, which are secured thereto as shown in Fig. 1, and which are adapted to pass through slots 17, formed in the cup-shaped plunger 9, and the cup-shaped receptacle 5 is also provided with similar slots 18, into which said plates are adapted to pass.

Pivotally connected with the arm 6 of the cup-shaped receptacle 5 at 19 is a lever 20, a part of which is preferably curved or circular in form, as shown at 21, and the curved or circular portion 21 of the lever 20 is passed through the slot 12 in the yoke 11 and through the opening 14 in the shaft 13, and said lever is provided with a projecting arm or handle 22.

The operation will be readily understood from the foregoing description when taken in connection with the accompanying drawings and the following statement thereof.

The lemon or other fruit, the juice of which it is desired to extract, or a part of said lemon or other fruit, is placed in the receptacle 5, the lever 20 being raised to admit of this operation. The raising of the lever 20 is accomplished by means of the handle 22 of said lever, the handle 7 of the receptacle 5 being held in one hand, and the raising of the lever 20 separates the cup-shaped plunger 9 from the cup-shaped receptacle 5 and also separates the supplemental plunger 15 from the cup-shaped plunger 9 or raises said plunger 15, so that the blades 16 will be drawn upwardly far enough to permit of the insertion of the lemon or other fruit beneath the plunger 9.

After the lemon or other fruit has been placed in the cup-shaped receptacle 5 the lever 20 is depressed by forcing the handle or arm 22 thereof downwardly or in the direction of the handle 7, and this operation forces the cup-shaped plunger 9 into the cup-shaped receptacle 5 and at the same time forces the supplemental plunger 15 into the cup-shaped plunger 9 and the blade 16 through the slots or openings 17 in the plunger 9 and through the lemon or other fruit into the slots or openings 18 into the cup-shaped plunger 5, and as the free end of the handle 22 of the lever 20 is depressed the plunger 9 will be forced still farther into the cup-shaped receptacle 5 and the juice will be thoroughly extracted from the lemon or other fruit and will pass through the slots or openings 18 in the receptacle 5 and into a cup or other receptacle prepared there-

for. The bottom of the cup-shaped receptacle 5 is also preferably provided with a perforation or opening 23, and a number of said perforations or openings may be employed, if desired, and the blades 16 are not thick enough to entirely fill the slots or openings 18, and the juice from the lemon or other fruit will also pass through said slots or openings.

The blades 16 serve to divide the lemon or other fruit into slices and to thoroughly cut the rind thereof, so that all the juice will escape therefrom, and it will thus be seen that I accomplish the object of my invention by means of a device which is simple in construction and operation and perfectly adapted to produce the result for which it is intended.

The lever 20 is free to move in the opening 14 in the shaft 13 and also in the slot 12 in the yoke 11, and when said lever is raised or depressed it will move longitudinally through said opening and through said slots, as will be readily understood, while the yoke 11 of the cup-shaped plunger 9, together with said cup-shaped plunger and the supplemental plunger 15, will be compelled thereby to move in a line at right angles to the center of the cup-shaped receptacle 5.

Having fully described my invention, I claim as new and desire to secure by Letters Patent—

1. A device for extracting the juice of lemons and other fruits, comprising a cup-shaped receptacle provided with openings, said cup-shaped receptacle being provided at one side with an arm, to which is hinged a lever, and at the opposite side with a handle, and at the side thereof at right angles to said arm and said handle with vertical rods, a cup-shaped plunger mounted on said rods and adapted to slide thereon, and provided with a vertical yoke, in which is formed a slot through which said lever passes, a shaft passing vertically through said yoke and through said slot and provided with an opening through which said lever passes, said shaft being provided at its lower end with a supplemental plunger, the lower surface of which is convex, and a blade or blades secured to the lower convex surface of the supplemental plunger, and adapted to pass through slots in the cup-shaped plunger, and into similar slots in the cup-shaped receptacle, substantially as shown and described.

2. A device for extracting the juice of lemons and other fruits, consisting of a cup-shaped receptacle, in which are formed slots, a cup-shaped plunger mounted thereover, and adapted to move vertically and provided with corresponding slots, a supplemental plunger mounted over said cup-shaped plunger and adapted to move vertically, and provided with blades which are adapted to pass through the slots formed in said cup-shaped plunger, and into the slots formed in the cup-shaped receptacle, and means for operating said cup-shaped plunger and said supplemental plunger, substantially as shown and described.

In testimony that I claim the foregoing as my invention I have signed my name, in presence of the subscribing witnesses, this 26th day of February, 1897.

GEORGE WONDERS.

Witnesses:
    JAMES FLINN,
    JNO. O'TOOLE.